United States Patent [19]

Clapp

[11] Patent Number: 4,596,426
[45] Date of Patent: Jun. 24, 1986

[54] DUPLEX MECHANICAL LOCK CONTROL UNIT FOR A PARKING BRAKE SYSTEM

[76] Inventor: Edward H. Clapp, 4117 Druid Hills, Apt. #216, Dallas, Tex. 75224

[21] Appl. No.: 568,590

[22] Filed: Jan. 6, 1984

[51] Int. Cl.⁴ .............................................. B60R 25/08
[52] U.S. Cl. ..................................... 303/89; 188/265; 137/597
[58] Field of Search ................. 303/28, 30, 29, 89, 303/84 A, 71, 84 R, 9, 13, 14, 15, 16, 17, 6 M, 7, 8; 188/151 A, 170, 265; 137/597

[56] References Cited

U.S. PATENT DOCUMENTS

| | | | |
|---|---|---|---|
| 794,882 | 7/1905 | Pagenhart | 91/166 |
| 1,085,964 | 2/1914 | Briggs | 91/44 |
| 1,176,625 | 3/1916 | Tyson | 188/163 |
| 1,295,020 | 2/1919 | Fallek | 188/163 |
| 2,041,065 | 5/1936 | Hemphill | 188/265 |
| 2,099,453 | 11/1937 | Searle | 303/89 |
| 2,224,215 | 12/1940 | Chartock et al. | 188/364 |
| 2,240,783 | 5/1941 | Jandus | 74/520 |
| 2,268,606 | 1/1942 | Mazur | 188/153 R |
| 2,342,812 | 2/1944 | Martinson | 91/44 |
| 2,579,616 | 12/1951 | Sahlgaard | 303/89 |
| 3,018,852 | 1/1962 | Stanton | 188/72.3 |
| 3,037,819 | 6/1962 | Sukala | 303/89 |
| 3,101,133 | 8/1963 | House et al. | 188/170 |
| 3,162,098 | 12/1964 | Lindberg | 92/13.5 |
| 3,173,726 | 3/1965 | Valentine et al. | 303/9 |
| 3,182,566 | 5/1965 | Berg et al. | 92/24 |
| 3,240,537 | 3/1966 | Valentine | 303/29 |
| 3,240,539 | 3/1966 | Schubert | 303/29 |
| 3,260,331 | 7/1966 | Borman, Jr. | 188/72.4 |
| 3,295,878 | 3/1967 | Houvener | 292/144 |
| 3,312,314 | 4/1967 | Peters | 188/353 |
| 3,482,666 | 12/1969 | Case et al. | 188/265 |
| 3,597,016 | 8/1971 | Gachot et al. | 303/9 |
| 3,613,515 | 10/1971 | Swander, Jr. et al. | 92/63 |
| 3,759,147 | 9/1973 | Johnsson et al. | 92/19 |
| 3,791,492 | 2/1974 | Neilsen | 188/170 |
| 3,842,716 | 10/1974 | Swander, Jr. | 92/63 |
| 3,874,747 | 4/1975 | Case et al. | 303/89 |
| 3,992,064 | 11/1976 | Carton et al. | 303/29 |
| 4,037,622 | 7/1977 | Osheroff et al. | 137/597 |
| 4,170,066 | 10/1979 | Blomberg et al. | 303/114 |
| 4,182,535 | 1/1980 | Funnin | 303/9 |
| 4,472,001 | 9/1984 | Funnin | 303/29 |

FOREIGN PATENT DOCUMENTS

| | | |
|---|---|---|
| 604101 | 10/1934 | Fed. Rep. of Germany . |
| 179998 | 10/1954 | Fed. Rep. of Germany . |
| 1162215 | 1/1964 | Fed. Rep. of Germany . |

OTHER PUBLICATIONS

"Mini-Max", Trans-Quip Industries brochure, Apr. 24, 1975, Dallas, Texas.

*Primary Examiner*—Bruce H. Stoner, Jr.
*Assistant Examiner*—Alvin Oberley
*Attorney, Agent, or Firm*—Richards, Harris, Medlock & Andrews

[57] ABSTRACT

A vehicle brake control system for the wheels (122) of a vehicle wherein each wheel (122) includes a brake assembly (110) is provided. The control system includes tanks (14, 16) containing pressurized fluid. Brake actuators (21, 22, 23, 24) are interconnected to the wheels (122) of the vehicle for controlling a mechanical lock (162) for the brake assembly (110) associated with each wheel (122). A control unit (40) is interconnected to the tanks (14, 16) and the actuators (21, 22, 23, 24) for supplying fluid from a tank (14, 16) to the actuators (21, 22, 23, 24) to control the engagement and disengagement of the brake lock (162) in the event of loss of pressure in either of the tanks (14, 16).

6 Claims, 7 Drawing Figures

FIG. 2

FIG. 3

DUPLEX MECHANICAL LOCK CONTROL UNIT FOR A PARKING BRAKE SYSTEM

TECHNICAL FIELD

This invention relates to a pneumatic control unit for mechanical parking brake locks, and more particularly to a pneumatic control unit for trailers where pneumatically actuated braking systems employ pressurized air from two or more air tanks carried by the trailer of a tractor-trailer vehicle.

BACKGROUND ART

The requirements for positive brake locking devices for air braked trailers are stringent. Trailers left with brakes locked under the control of air pressure in storage tanks on the trailer are subject to unintended release from leakage which results in the loss of pressure in the storage tank, thereby leaving the trailer free to roll.

Heretofore, brake locking devices have been provided of various types. Representative of these types are described in U.S. Pat. Nos. 2,041,065; 3,759,147; and 3,874,747. These prior devices were specifically designed for use with trailers where only one storage tank was required. To achieve a mechanical lock, a spring was used to push a pawl downward to connect with a ratchet on the brake rod of the brake actuator chamber. The pawl was forced downward against the remaining force of the trailer's air supply, making it difficult to consistently obtain a mechanical lock on the brakes. Therefore, under certain road conditions, trailers utilizing such prior devices were vulnerable to roll off.

Whenever there is a failure in any of the components designed to contain compressed air of a brake system, such as a leak in a brake delivery hose, the air tank itself, diaphragms or pneumatic valves, it becomes impossible to release the brakes with the trailer's energy supply. Heretofore, the only way to release the brakes was to manually make the brake inoperative. In such cases, the vehicle could become a hazard and become dangerous.

Accordingly, there is a need for an improved control unit for a parking brake system for tractor-trailer vehicles where two tanks of pressurized air are required in order to ensure that the brakes can be released in the event of a failure in the compressed air delivery system.

DISCLOSURE OF THE INVENTION

In accordance with the present invention, a duplex control unit for mechanical brake locking devices is provided wherein two or more air tanks pressurized from a compressor on a towing vehicle serves to supply energizing air to the brake actuators is provided.

When the trailer is in a parked position and the towing vehicle is disconnected from the trailer, the trailer's brakes are automatically set with air stored in the pressurized air tanks carried on the trailer. The present control unit operates to separate the air tanks to thereby protect the vehicle's performance against a failure of either of the air tanks or any other component of the compressed air system used on the trailer that is designed to contain compressed air or brake fluid.

In accordance with the present invention, should a failure occur in any component of the compressed air system, the present control unit will sense the failure and signal the mechanical brake lock, located in the actuator chamber, to engage when the air pressure approaches a predetermined unsafe level. At that time, the present control unit bypasses the force of the trailer's energy supply and a positive lock is achieved, thereby eliminating any danger of rolloffs. When the towing vehicle is again connected to the trailer and it is desired to release the brakes, the present control unit receives a signal from the towing vehicle's main compressor and seals off the air in the portion of the system where the failure had occurred, allowing energy to flow through air passages from the protected air tank, thereby releasing the brakes in spite of a failure in any of the compressed air system containing compressed air or brake fluid.

BRIEF DESCRIPTION OF THE DRAWINGS

The present invention can be more completely understood with reference to the following Detailed Description taken in conjunction with the accompanying Drawings in which:

FIG. 2 is a perspective view of the present duplex control unit;

FIG. 3 is a sectional view taken generally along sectional lines 3—3 of FIG. 2 of the present duplex control unit;

DETAILED DESCRIPTION

Figure 1:
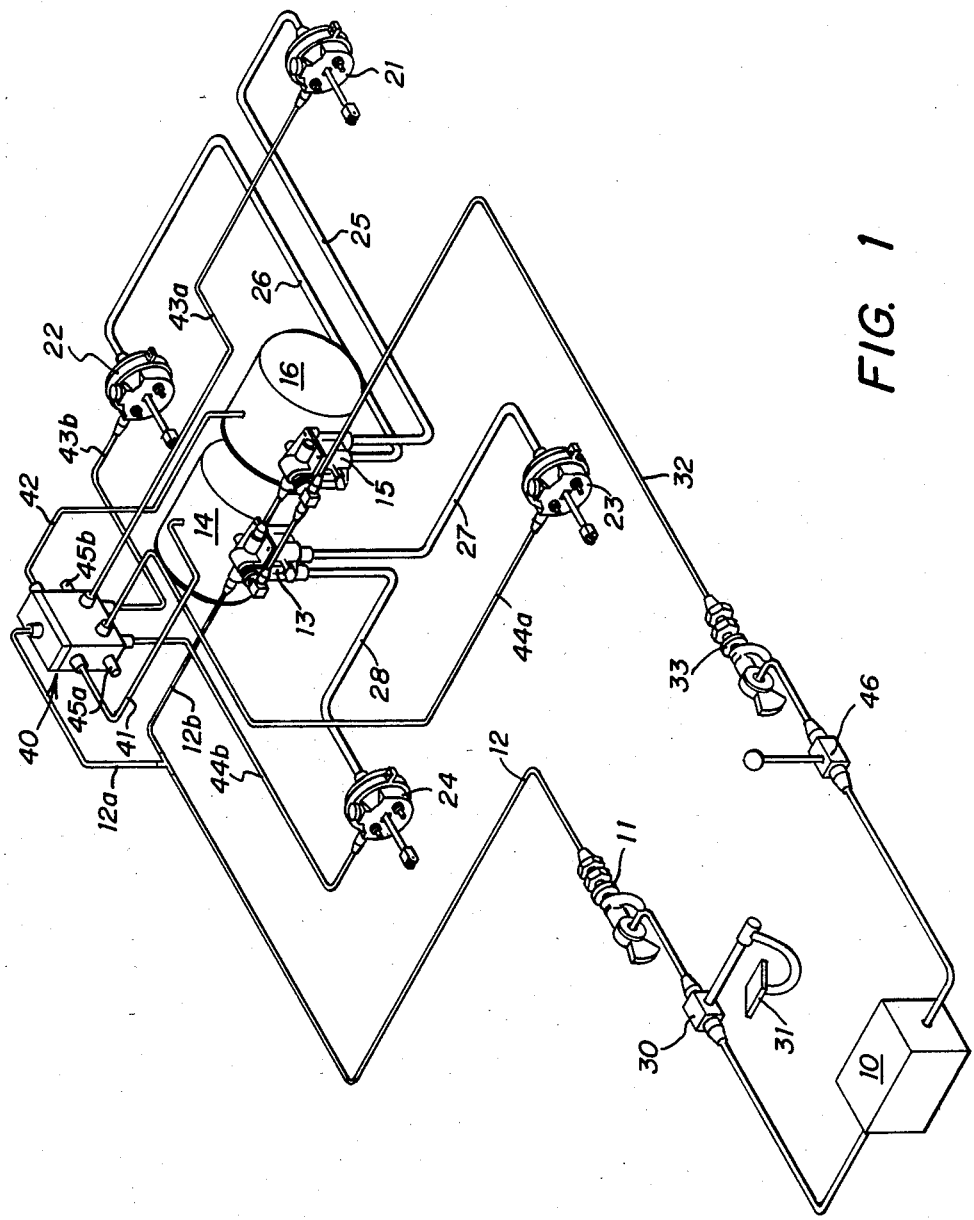
FIG. 1 is a schematic flow diagram of a brake locking system embodying the present invention.

Referring to FIG. 1, a compressor 10 mounted on the towing vehicle or tractor is connected by way of a coupling or "glad hand" 11 to an emergency supply line 12. Emergency supply line 12 serves as the main line that delivers energy from the tractor to the trailer. Line 12 is connected via line 12a to a duplex control unit 40 of the present invention. Line 12 is also connected via line 12b to a check valve in a relay emergency valve 13 to pressurize a first air tank 14. Line 12 is also interconnected via line 12b to a second relay emergency valve 15 interconnected to a second tank 16 for pressurizing tank 16. Relay emergency valves 13 and 15 are of the type manufactured and sold by Sealco Air Controls, Inc. City of Industry, Calif. Although tanks 14 and 16 are shown adjacent each other in FIG. 1, it is understood that tanks 14 and 16 may be mounted to any desired location on the trailer, such as, for example, adjacent each axle of the trailer.

The system of FIG. 1 further includes four brake actuators with actuators 21 and 22 being provided to actuate the brakes on the rear axle of the trailer and actuators 23 and 24 being provided for actuating the brakes on the forward axle of the trailer. The operation of actuators 21, 22, 23 and 24 will subsequently be described with respect to FIGS. 4-7.

Relay emergency valves 13 and 15 serve as a combination directional control and relay of energy flowing from compressor 10 through line 12 to the trailer. Relay emergency valve 13 serves to supply air from tank 14 by way of lines 27 and 28 to actuators 23 and 24, respectively. Similarly, relay emergency valve 15 serves to supply air from tank 16 via lines 25 and 26 to actuators 21 and 22, respectively. As air is passed through line 12, relay emergency valves 13 and 15 direct the air to tanks 14 and 16, respectively through the one way check valves located within relay emergency valves 13 and 15.

When a brake application is desired, relay emergency valves 13 and 15 allow air to pass to actuators 21, 22, 23 and 24 via lines 25, 26, 27 and 28, respectively. Relay emergency valves 13 and 15 further act in the event of an emergency and will automatically apply the trailer's brakes in a case such as the braking of supply line 12. Service brake operation is accomplished when the operator of the towing vehicle actuates foot valve 30 interconnected between compressor 10 and coupling 11 by depressing brake pedal 31. Air is thereby released from compressor 10 through supply line 12 to relay emergency valves 13 and 15. This pressure signals relay emergency valves 13 and 15 that a service brake application is desired to allow air to pass to actuators 21, 22, 23 and 24 via lines 25, 26, 27 and 28.

Compressor 10 is also interconnected to relay emergency valves 13 and 15 via a line 32 and a coupling 33. Interconnected between compressor 10 and coupling 33 is an emergency brake valve 46. Operation of emergency brake valve 46 operates in a manner similar to actuation of foot valve 30 to allow air to pass to brake actuators 21, 22, 23 and 24 via lines 25, 26, 27 and 28, respectively.

Duplex control unit 40 of the present invention serves to control the application and release of mechanical locks, to be subsequently described with respect to FIGS. 5–7, located in actuators 21, 22, 23 and 24. Control unit 40 is interconnected to air tanks 14 and 16 via lines 41 and 42, respectively. Control unit 40 is interconnected to actuator 21 and actuator 22 via lines 43a and 43b, respectively. Control unit 40 is also interconnected to actuators 23 and 24 via lines 44a and 44b, respectively. Control unit 40 also includes vent apertures 45a and 45b.

In operation of the system utilizing the present duplex control unit 40, connectors 11 and 33 are coupled to mating units on the tractor whereby tanks 14 and 16 become pressurized by air flow through relay emergency valves 13 and 15. Actuators 21, 22, 23 and 24 normally are operated by actuation of foot pedal 31 which supplies compressed air by way of valve 30 to line 12, thereby pressurizing lines 25, 26, 27 and 28. When line 12 is pressurized from compressor 10 on the towing vehicle, the pressure from line 12 provides a signal to duplex control unit 40 which in turn directs the air stored in tank 16 to flow into lines 44a and 44b and via duplex control unit 40 air flows to the mechanical locks in actuators 23 and 24, respectively. At the same time, control unit 40 directs air stored in tank 14 to flow through line 41 and via duplex control unit 40 air flows to lines 43a and 43b to the mechanical locks in actuators 21 and 22, respectively. During such operations, the mechanical locks within actuators 21, 22, 23 and 24 are disabled by the presence of pressure in lines 43a, 43b, 44a and 44b.

When line 12 is vented to the atmosphere, either by driver control or disconnection of coupling unit 11, duplex control unit 40 operates to separate air tanks 14 and 16, one from the other, bringing about an axle by axle situation. The operation of duplex control unit 40 protects the trailer's performance against a failure of any of the components which are designed to contain compressed air. At the same time, duplex control unit 40 will redirect the air flow from tank 16 through line 42, and now via lines 43a and 43b to actuators 21 and 22, respectively instead of through lines 44a and 44b to actuators 23 and 24. Duplex control unit 40 also redirects the air from tank 14 through lines 41 now via line 44a and 44b to actuators 23 and 24 instead of via lines 43a and 43b to actuators 21 and 22. Therefore it can be seen that tanks 14 and 16 are separated, tank 14 providing air pressure to actuators 23 and 24 and tank 16 providing air pressure to actuators 21 and 22.

Should a failure occur in any of the components containing compressed air, control unit 40 will sense this failure when the pressure in either tank 14 or 16 has reached a predetermined level of safety such as, for example, between 32 and 40 pounds per square inch. At that time, control unit 40 will seal off the area of the trailer where the failure has occurred and release the air in either lines 43a and 43b or 44a and 44b, depending upon where the failure has occurred, to the atmosphere through either vents 45b or 45a, respectively. When the air in either of lines 43a and 43b or 44a and 44b has been vented to the atmosphere, the spring located at the top of the mechanical lock of actuators 21, 22, 23 and 24 will push the lock downward to engage the ratchet teeth on the push rod, to be subsequently described in connection with FIGS. 5–7. This action causes a positive brake lock to occur and eliminates the possibility of the trailer rolling off, due to a leakage type failure in the system. When it becomes desirous to release the brakes, compressor 10 on the towing vehicle is reconnected to supply line 12. The pressure from supply line 12 signals control unit 40. Control unit 40 then directs the air to flow from the protected tank where the failure had not occurred, either tank 14 or 16, through either lines 43a and 43b or 44a and 44b to the mechanical locks of either actuators 21 and 22 or 23 and 24, using air stored in either of tanks 14 or 16 to thereby release the actuators and brakes of that portion of the system that had failed.

It is to be noted that although the brakes associated with actuators 21, 22, 23 and 24 are set when supply line 12 is vented to the atmosphere, the mechanical locking of the brakes is delayed until such time as the pressure in tanks 14 or 16 falls below the predetermined level of safety. This operation of employing a delay in the application of the mechanical lock provides a distinct advantage over previously mentioned locking devices. This delay protects the equipment from wear and tear from being used when it is not needed and it protects the drums of the brakes from undue damage that could occur if the brakes were locked into position while in a heated condition.

Figures 2, 3:
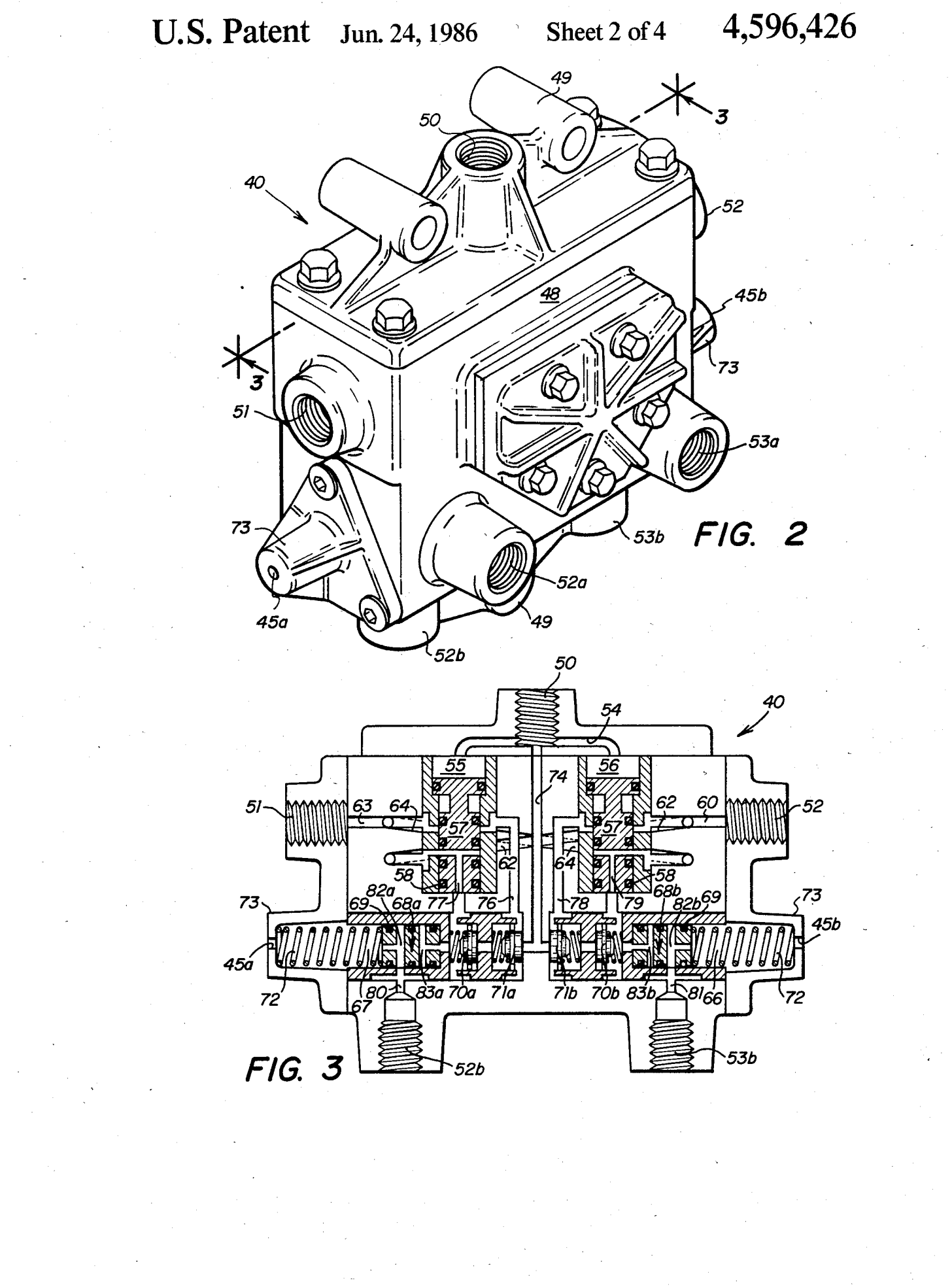

Referring simultaneously to FIGS. 2 and 3, the structure of duplex control unit 40 will now be described. Duplex control unit 40 includes a housing 48 including mounting brackets 49 for mounting control unit 40 to either of tanks 14 or 16 or any other desired position on the trailer.

Line 12a (FIG. 1) enters control unit 40 through a port 50. Line 41 interconnecting control unit 40 to tank 14 is interconnected to control unit 40 via port 51. Similarly, line 42 interconnecting control unit 40 to tank 16 is interconnected to control unit 40 via a port 52. Line 44a and line 44b are interconnected to ports 52a and 52b of control unit 40. Lines 43a and 43b are interconnected to ports 53a and 53b of control unit 40.

Port 50 is interconnected via a channel 54 to cylindrical chambers 55 and 56. Cylindrical chambers 55 and 56 are in axial alignment with and connect to channel 54. Control unit 40 includes piston assemblies generally identified by the numeral 57. Piston assemblies 57 are mounted to axially reciprocate in chambers 55 and 56 and include suitable sliding seals 58 to seal the space between piston assemblies 57 and the walls of chambers 55 and 56. Piston assemblies 57 include apertures 77 and 79, respectively. A plurality of bores 60, 63, and channels 62, 64, 76, 78 open into cylindrical chambers 55 and 56 to vent pressurized air into and out of the chambers. Piston assemblies 57 function as valves to seal or uncover predetermined bores and apertures depending on the position of the piston assemblies 57 within the chambers 55 and 56. For example, when supply line 12 is pressurized, piston assemblies 57 are forced to the bottom of chambers 55 and 56. Air from tank 16 enters port 52, but because piston assembly 57 has sealed bore 60, the air flows through channel 62, through aperture 77, past check valve 70a, into aperture 83a forcing piston assembly 68a toward vent 45a so that aperture 83a aligns with bore 80, and then through bore 80 and out port 52b. However, when line 12 is not pressurized, piston assemblies 57 move to the top of chambers 55 and 56, and air from tank 16 entering port 52 is vented through bore 60 into aperture 79 and channel 78, past check valve 70b, into aperture 83b forcing piston assembly 68b toward vent 45b so that aperture 83b aligns with bore 81, and then through bore 81 and out port 53b. It should be understood that air from tank 14 entering through port 51 is vented and controlled in a manner similar to that from tank 16.

Port 52 is interconnected to chamber 56 via a bore 60 and is further interconnected to chamber 55 via a channel 62. Port 51 is interconnected to chamber 55 via a bore 63 and is further interconnected to chamber 56 via a channel 64. Port 52 and therefore tank 16 communicate with chamber 55 only when piston assembly 57 within chamber 56 is positioned at the bottom of chamber 56 as illustrated in FIG. 3. Similarly, port 51 and tank 14 can only communicate with chamber 56 when piston assembly 57 of chamber 55 is in the position illustrated in FIG. 3. Piston assemblies 57 are positioned at the bottom of chambers 55 and 56 when line 12a (FIG. 1) is pressurized.

Control unit 40 further includes cylindrical chambers 66 and 67 disposed generally perpendicular to cylindrical chambers 55 and 56. Contained within cylindrical chambers 66 and 67 are piston assemblies generally identified as 68a and 68 b. Piston assemblies 68a and 68b are mounted to axially reciprocate in chambers 66 and 67 and include suitable sliding seals 69 to seal the space between piston assemblies 68 and the walls of chambers 66 and 67. Also disposed within chambers 66 and 67 are check valves 70a and 70b and 71a and 71b. Further disposed within cylindrical chambers 66 and 67 is a spring 72 which partially extends to an end cap 73 which includes vents 45a and 45b of control unit 40.

Channel 54 is interconnected to chambers 66 and 67 via a bore 74. Chamber 55 is interconnected to chamber 67 via a channel 76. Chamber 55 is also interconnected to chamber 67 via an aperture 77 within piston assembly 57. Chamber 56 is interconnected to chamber 66 via a channel 78. Chamber 56 is also interconnected to chamber 66 via an aperture 79 contained within piston assembly 57 of chamber 56. Port 52b and thereby actuator 24 is interconnected to chamber 67 via a bore 80. Port 53b and thereby actuator 22 is interconnected to chamber 66 via a bore 81. It being understood that port 52a is also interconnected to chamber 67 via bore 80 and port 53a is interconnected to chamber 66 via bore 81.

Bore 80 selectively communicates with apertures 82a and 83a of piston assembly 68a within chamber 67. Similarly, bore 81 selectively communicates with apertures 82b and 83b of piston assembly 68b within chamber 66.

In operation of control unit 40, when line 12a is pressurized, piston assemblies 57 within cylindrical chambers 55 and 56 are positioned in the position as illustrated in FIG. 3. In this position, air from tank 16 enters port 52 and is routed through bore 60 and channel 62 into cylindrical chamber 55, through aperture 77, and into aperture 83a which thereby causes piston assembly 68 to move toward vent 45a. The movement of piston assembly 68a toward vent 45a seals vent 45a and allows aperture 83a to communicate with bore 80 and thereby allows air from tahk 16 to pass through port 52b to actuator 24. This pressurized air applied to actuator 24 maintains the mechanical lock within actuator 24 disengaged. In a similar manner, air from tank 14 enters port 51 and passes into chamber 56 via bore 63 and channel 64. This air within chamber 56 enters aperture 83b via aperture 79 to compress spring 72 and align aperture 83b with bore 81 to allow air from tank 14 to pass through port 53b to actuator 22. This pressure within actuator 22 causes the mechanical lock to be disengaged and the brake released. It will be understood that actuators 23 and 21 operate in a similar manner.

When pressure is removed from line 12a, piston assemblies 57 are drawn upwardly within cylindrical chambers 55 and 56 to seal channel 54. In this position, air from tank 16 enters port 52 and enters aperture 79 via bore 60. The air from tank 16 passes through bore 60, through aperture 79, and then through aperture 83b and to actuator 22 via bore 81 and port 53b. In a similar manner, when pressure is removed from line 12a, air from tank 14 passes through aperture 77, through aperture 83a, through bore 80, and through port 52b to provide pressure to actuator 24. When pressure is removed from line 12a and thus from bore 74, check valves 71a and 71b seal bore 74 to prevent pressure from venting out port 50. In this mode of operation, the vehicle is in an axle by axle parking mode wherein each tank 14 and 16 operates independently of the other.

Should a failure occur in either tank 14 or 16 resulting in a decrease of pressure, there will be an insufficient amount of pressure against piston assemblies 68a and 68b to maintain spring 72 compressed. In the event of a failure in tank 16, spring 72 will expand to cause the alignment of aperture 82b of piston assembly 68b with bore 81. Since vent 45b is now open, the pressure within line 43b from actuator 22 is vented to the atmosphere. With this decreased pressure within actuator 22, the mechanical lock within actuator 22 is engaged. In a similar manner, if a failure should have occurred in tank 14, the pressure within actuator 24 is vented to the atmosphere through vent 45a and the mechanical lock associated with actuator 24 is actuated.

An important aspect of the present control unit 40 is the ability to provide a source of pressurized air to release the mechanical lock of an actuator where the tank 14 or 16 associated with that actuator has failed. For example, should tank 16 have a failure resulting in the actuation of the mechanical lock to lock the brake associated with actuator 22, and should it be desired to resupply the pressure to line 12a to drive the tractor-trailer, it is necessary to provide a source of air to release the mechanical lock associated with actuator 22. In this situation control unit 40 operates to supply the pressurized air from tank 14 to release the mechanical lock of actuator 22. In this mode of operation, since line 12a is again pressurized, piston assembly 57 within cylindrical chamber 55 is positioned at the bottom of cylindrical chamber 55. Air from tank 14 therefore passes through channel 64, through aperture 79 of piston assembly 57 within chamber 56, and to aperture 83a, with resulting compression of spring 72 and repressurization of line 43b to actuator 22. This repressurization releases the mechanical lock associated with actuator 22. Since at this time there is no pressure within tank 16, pressure will attempt to vent from actuator 24 through line 44b, through port 52b, through aperture 83a, through aperture 77, through channel 62, and out port 52. However, as soon as the pressure in line 44b begins to drop, the higher pressure in bore 74 forces check valve 70a to seal aperture 83a, thereby maintaining pressure in line 44b and sealing off failed tank 16. If the failure is originally in tank 14, control valve 40 operates in a similar manner to release the mechanical locks and isolate failed tank 14. Therefore it can be seen that the pressurized air within the system that had not failed supplies air to release the brake lock from the actuator associated with the tank that did fail.

Figure 4:
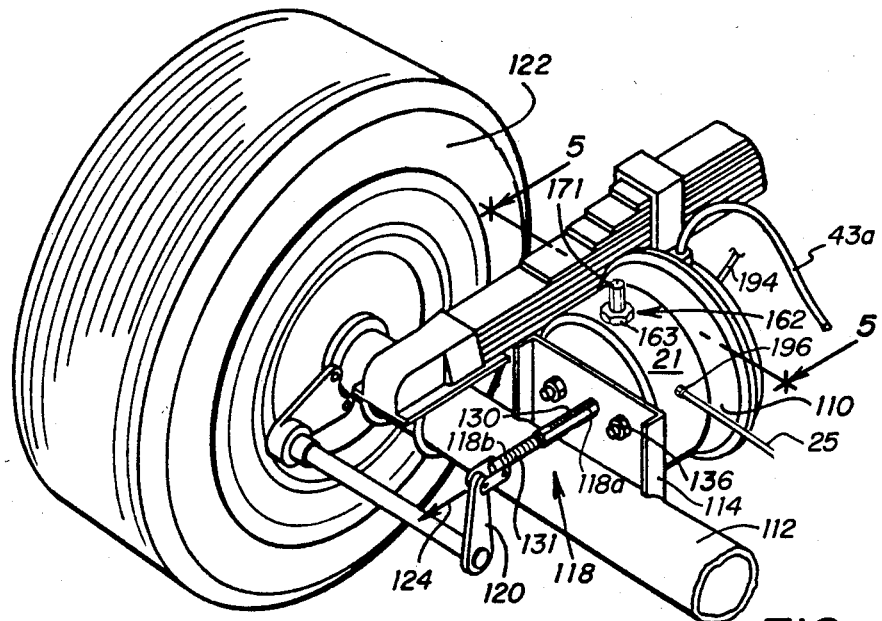
FIG. 4 is a perspective view of a conventional fluid brake mechanism mounted to a wheel of a vehicle with one of the brake actuators illustrated in FIG. 1.

Referring now to FIG. 4, a conventional fluid brake system utilizing the present invention is illustrated. Brake actuator 21, like actuators 22, 23 and 24, are used with a fluid actuated brake having a chamber 110 mounted on an axle 112 using a bracket 114 and bolts 136. Each brake chamber 110 is connected to a source of pressurized fluid through a line 194 for actuating the brake. An actuation rod, generally identified by the numeral 118, has one end 118a connected to chamber 110 and the other end 118b connected to a crank arm 120 of the conventional brake associated with a wheel 122. The system illustrated in FIG. 4 is a conventional air brake system, wherein foot valve 30 (FIG. 1) is operated by the driver to selectively convey pressurized air through line 194 to chamber 110. Chamber 110 will selectively axially reciprocate rod 118 to thereby move arm 120 to operate the brakes of wheel 122.

End 118a of rod 118 is square shaped and end 118b is substantially cylindrically shaped. A plurality of ratchet teeth 130 are spaced along the top portion of end 118a of rod 118 and threads 131 are provided along end 118b of rod 118.

Through operation of chamber 110, rod 118 is axially reciprocated in the forward and reverse direction indicated by arrow 124, which in turn rotates crank arm 120 to engage and disengage the brakes associated with wheel 122. As illustrated in FIG. 4, movement of rod 118 in the direction of arrow 124 engages the brakes of wheel 122 while movement of rod 118 in the reverse direction of arrow 124 disengages the brakes of wheel 122.

The mechanical locking device associated with actuators 21, 22, 23 and 24 (FIG. 1) used with the present invention is mounted within chamber 110 and is generally identified by the numeral 162.

Figure 5:
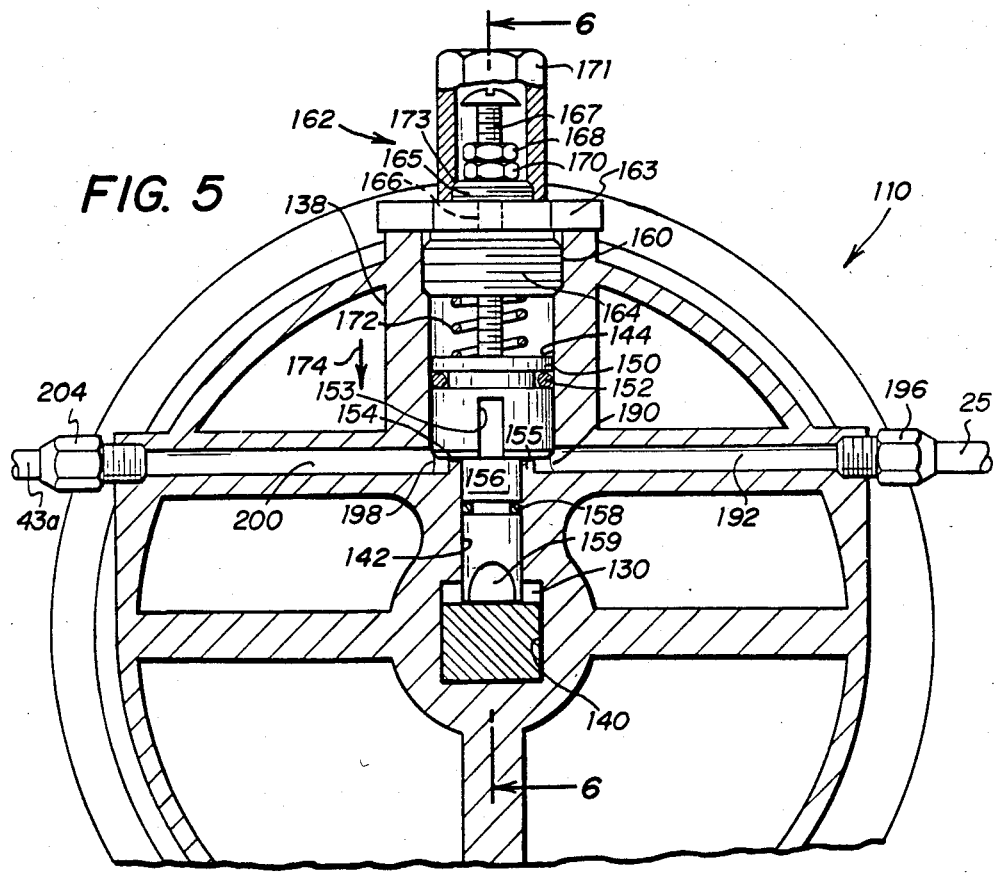
FIG. 5 is a sectional view taken generally along sectional lines 5—5 of FIG. 4, illustrating the brake locking device utilized with the present invention in the unlocked position.

Referring simultaneously to FIGS. 4 and 5, mechanical locking device 162 includes a cylindrically shaped housing 138, which is constructed from aluminum material to reduce corrosive effects on housing 138 when in use. The upper portion of housing 138 of mechanical locking device 162 extends through a side wall of chamber 110 and is sealed thereto in a fluid tight relationship using structure well known in the art, such as, for example, welding, gaskets and the like. A first bore 140 extends through housing 138 and is of a size to receive end 118a of rod 118. Bore 140 is large enough to allow rod 118 to axially reciprocate therethrough in the forward and reverse directions of arrow 124 (FIG. 4).

A second bore 142 extends through housing 138 and intersects first bore 140 at a right angle thereto. An enlarged cylindrical chamber 144 is formed in housing 138 on the end opposite from bore 140. Cylindrical chamber 144 is in axial alignment with and connects to bore 142.

Figure 6:
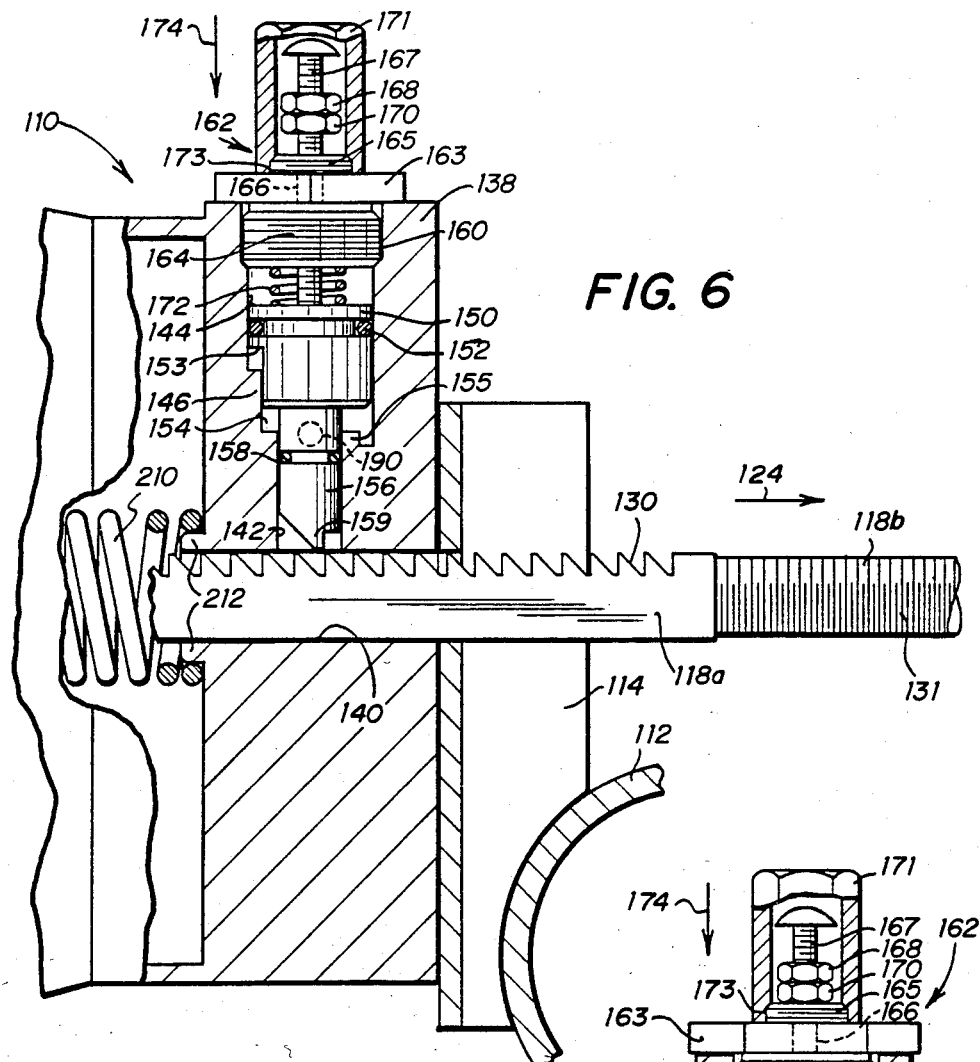
FIG. 6 is a sectional view taken generally along sectional lines 6—6 of FIG. 5, illustrating the brake locking device utilized with the present invention in the unlocked position.

Referring simultaneously to FIGS. 5 and 6, mechanical locking device 162 includes a piston assembly generally identified by the numeral 150. Piston assembly 150 is mounted to axially reciprocate in chamber 144 and includes a suitable sliding seal 152 to seal the space between piston assembly 150 and the walls of chamber 144. Piston assembly 150 further includes a slot 153 which mates with rib 146 (FIG. 6) to maintain piston assembly 150 in the desired, non-rotating position. Piston assembly 150 and chamber 144 define a variable volume chamber 154 below piston assembly 150.

The lower end of variable volume chamber 154 includes an upstanding ring member 155 which acts as a stop to halt movement of piston assembly 150 in the direction of arrow 174. Piston assembly 150 includes a reduced diameter portion 156 which extends into bore 142. A suitable sliding seal 158 is provided on reduced diameter portion 156 of piston assembly 150 for sealing the space between bore 142 and reduced diameter portion 156. A pawl 159 is formed on the end of reduced diameter portion 156 of piston assembly 150 for selective engagement with ratchet teeth 130 of rod 118.

The upper end of chamber 144 is provided with threads 160. A plate 163, which extends across chamber 144, and a first threaded neck member 164 and a second threaded neck member 165 function to close upper end of chamber 144. Each of neck members 164 and 165 is formed integrally with plate 163. A bore 166 is centrally formed through plate 163 and first and second neck members 164 and 165. A threaded fastener 167 is connected to piston assembly 150 and extends through bore 166. A nut 168 and a locking nut 170 are provided on fastener 167.

Threaded neck member 164 is threadably engaged with threads 160 of the upper end of chamber 144. A cover housing member 171 is provided with internal threads 173 at its lower portion to allow cover housing member 171 to be threadably engaged with second threaded neck member 165. Cover housing member 171 protects the extended end portion of threaded fastener 167, while providing a fluid tight seal.

Mechanical locking device 162 further includes a compression coil spring 172 circumferentially positioned around fastener 167. Compression coil spring 172 normally resiliently urges piston assembly 50 to move in the direction of arrow 174 to cause pawl 159 to engage ratchet teeth 130 of end 118a of rod 118 (FIG. 4). If desired, raised bosses can be provided on the upper surface of piston assembly 150 for positioning spring 172.

A fluid port 190 communicates with variable volume chamber 154. Fluid port 190 is interconnected by a duct 192 to line 25. Duct 192 is internally threaded to allow attachment of line 25 using a suitable fitting 196. Similarly, a fluid port 198 circumferentially disposed from fluid port 190 around chamber 144 communicates with variable volume chamber 154. Fluid port 198 is interconnected via a duct 200 within chamber 110 to a line 43a. Duct 200 is internally threaded to allow attachment to line 43a using a suitable fitting 204.

Figure 7:
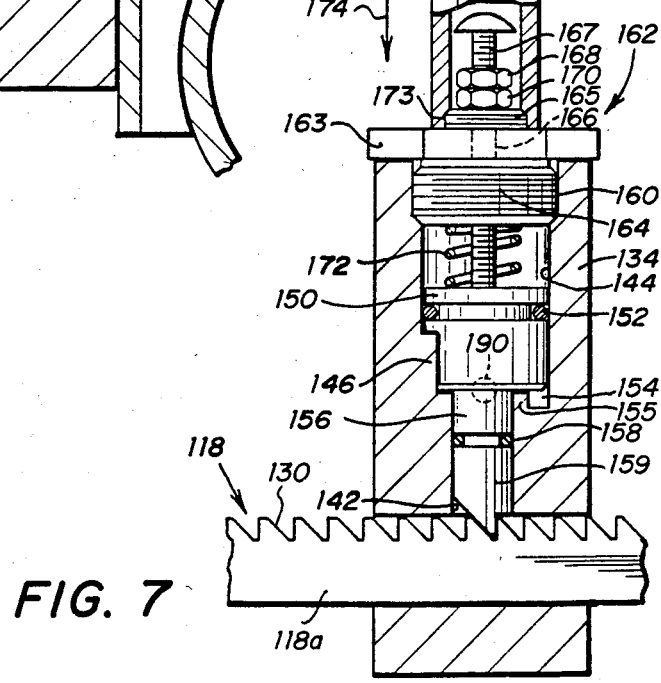
FIG. 7 is a sectional view similar to FIG. 6 illustrating the brake locking device utilized with the present invention in the locked position.

Referring simultaneously to FIGS. 5, 6 and 7, the operation of the mechanical locking device 162 will now be explained. Referring initially to FIG. 6 mechanical locking device 162 is illustrated in the disengaged position. In the disengaged position, pressure is applied through duplex control unit 40 (FIG. 1) through lines 25 and 43a and ports 190 and 198 into variable volume chamber 154. This pressure forces piston assembly 150 to move in the reverse direction of arrow 174 to compress coil spring 172 and move pawl 159 to a position away from ratchet teeth 130.

Upon removal of pressurized fluid from lines 25 and 43a, ports 190 and 198 and variable volume chamber 154 pressure will be removed from variable volume chamber 154 of the mechanical locking device 162, such that mechanical locking device 162 will move in the direction of arrow 174 to the engaged position illustrated in FIG. 7.

In the engaged position of locking device 162, the pressure in variable volume chamber 154 which overcomes the force of compression coil spring 172 is removed and therefore spring 172 moves piston assembly 150 and pawl 159 in the direction of arrow 174 to engage pawl 159 with ratchet teeth 130 on end 118a of rod 118. As illustrated in FIG. 7, the shape of pawl 159 and ratchet teeth 130 allow movement of brake rod 118 in the direction of arrow 124 to apply the brake of wheel 122, but prohibits movement in the reverse or brake releasing direction.

A spring 210 (FIG. 6) is provided to bias brake rod 118 in the reverse direction of arrow 124 when pawl 159 is disengaged from ratchet teeth 130. Spring 210 is positioned around a boss 212 which prevents spring 210 from engaging ratchet teeth 130 and interferring with the proper function of brake rod 118. Furthermore, boss 212 prevents brake rod 118 from damaging spring 210.

Therefore, the brake of wheel 122 can be applied and the mechanical lock device actuated to lock the brake in the applied position. In addition, as previously stated, if pressure is lost during use of the trailer, the brakes will be locked in position due to operation of actuators 21, 22, 23 and 24. Since it is conventional to use a safety brake applying apparatus which applies the brakes automatically upon loss of pressure, the combination of the brake applying device and the mechanical lock device 162 of actuators 21, 22, 23 and 24 results in the brakes being applied and locked in position.

Fastener 167 and nuts 168 and 170 cooperate to allow manual movement of piston assembly 150 and pawl 159. By adjusting nuts 168 and 170 on fastener 167, compression coil spring 172 can be compressed and pawl 159 disengaged from ratchet teeth 130 when pressure is absent from variable volume chamber 54. Additionally, if it is desired to park the vehicle, mechanical locking device 162 can be engaged and the vehicle either disconnected from the tractor or turned off, such that the brakes will be locked in position.

It therefore can be seen that the present invention provides for a duplex mechanical lock control unit which will sense a failure in any of the components containing compressed air and signal the mechanical brake lock located in an actuation chamber. The present control unit, at the same time, bypasses the force of the trailer's energy supply and a positive lock is achieved, thereby eliminating any danger of roll offs. When the towing vehicle is again connected to the trailer, and it is desired by the operator to release the brakes, the present control unit receives a signal from the towing vehicle's main compressor and seals off the air where the failure had occurred. The pressure then flows from the protected tank, thereby releasing the brakes of the trailer even with a failure in any of the components containing compressed air or brake fluid.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a vehicle brake system for the wheels of a vehicle wherein each wheel includes a brake assembly and a brake lock, two of the wheels being mounted on a first axle and two wheels being mounted on a second axle, the system including first brake locks associated with the first axle controlled from a first tank of pressurized fluid and second brake locks associated with the second axle controlled from a second tank of pressurized fluid, a control unit including:
   first means for interconnecting the first tank and the second brake locks;
   second means for interconnecting the second tank and the first brake locks; and
   means for operating said first and second means upon loss of pressure in the second or first tank, respectively, to cause said interconnecting of the first tank and the second brake locks and said interconnecting of the second tank and the first brake locks.

2. The control unit of claim 1 wherein said first and second means include piston means.

3. A parking brake control system for the brake assemblies of a vehicle, comprising:
   a pressurized fluid system comprising a first fluid pressure tank, a second fluid pressure tank, a detachable fluid pressure source, and fluid conduit means for connecting said tanks, pressure source, and brake assemblies;
   a mechanical parking brake lock in each brake assembly comprising spring means for actuating said mechanical lock upon failure of the pressurized fluid parking brake system;
   control means comprising a plurality of piston valve assemblies for supplying pressure from said pressure tanks to the brake assemblies to prevent actuation of said mechanical locks;
   said control means supplying pressure, in a first mode of operation when said pressure source is connected to the system, from said second pressure tank to a first set of brake assemblies and from said first pressure tank to a second set of brake assemblies;
   said control means supplying pressure, in a second mode of operation when said pressure source is disconnected from the system, from said first pressure tank to said first set of brake assemblies and from said second pressure tank to said second set of brake assemblies; and said control means supplying pressure, in said first mode of operation when said mechanical locks in one set of brake assemblies have actuated due to a loss of pressure in the corresponding pressure tank and said pressure source has been reconnected to the system, from said pressure tank which has not failed to said set of brake assemblies associated with the pressure loss to disengage said actuated mechanical locks.

4. The parking brake control system of claim 3, wherein said control means further comprises:

vent means for venting pressure to the atmosphere from a set of brake assemblies whose corresponding pressure tank has failed in said second mode of operation, thereby allowing actuation of said mechanical locks in said set of brake assemblies.

5. The parking brake control system of claim 4, wherein said vent means further comprises a spring biased piston assembly.

6. The parking brake control system of claim 4, wherein said control means further comprises:

check valve means for preventing fluid communication between the pressurized system and said failed pressure tank.

* * * * *

UNITED STATES PATENT AND TRADEMARK OFFICE
CERTIFICATE OF CORRECTION

PATENT NO. : 4,596,426

DATED : JUNE 24, 1986

INVENTOR(S) : EDWARD H. CLAPP

It is certified that error appears in the above-identified patent and that said Letters Patent is hereby corrected as shown below:

Col. 8, line 61, delete "50" and insert --150--;
Col. 9, line 61, delete "54" and insert --154--.

Signed and Sealed this

Ninth Day of December, 1986

Attest:

DONALD J. QUIGG

*Attesting Officer*   *Commissioner of Patents and Trademarks*